United States Patent

Sonoda

(10) Patent No.: US 9,285,785 B2
(45) Date of Patent: Mar. 15, 2016

(54) MOTOR CONTROL DEVICE FOR SUPPRESSING NATURAL VIBRATIONS

(71) Applicant: FANUC CORPORATION, Yamanashi (JP)

(72) Inventor: Naoto Sonoda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/272,641

(22) Filed: May 8, 2014

(65) Prior Publication Data

US 2014/0333249 A1 Nov. 13, 2014

(30) Foreign Application Priority Data

May 13, 2013 (JP) ................................. 2013-101613

(51) Int. Cl.
*G05B 11/42* (2006.01)
*H03L 7/00* (2006.01)
*G05B 13/02* (2006.01)
*G05B 19/404* (2006.01)

(52) U.S. Cl.
CPC ............ *G05B 13/024* (2013.01); *G05B 19/404* (2013.01); *G05B 2219/41117* (2013.01)

(58) Field of Classification Search
CPC ............................... H05K 5/0017; H05K 1/18

USPC .............................. 318/619, 630, 632; 331/11
See application file for complete search history.

(56) References Cited

U.S. PATENT DOCUMENTS

| 4,258,333 A * | 3/1981 | Demuliere et al. ............. 331/11 |
| 7,843,159 B2 | 11/2010 | Tazawa |
| 2009/0009128 A1 * | 1/2009 | Okita et al. ................... 318/619 |

FOREIGN PATENT DOCUMENTS

| JP | 4238273 B2 | 3/2009 |
| JP | 2012108610 A | 6/2012 |
| JP | 2012118766 A | 6/2012 |

* cited by examiner

*Primary Examiner* — Paul Ip
*Assistant Examiner* — Devon Joseph
(74) *Attorney, Agent, or Firm* — Hauptman Ham, LLP

(57) ABSTRACT

A frequency component extracting unit (15) extracts a frequency component included in a control signal at a first frequency step size. A frequency detection unit (16) detects, from the extracted frequency component, a frequency corresponding to a natural frequency of a target object constituted of a motor (3) and a driven member (4). A frequency step size setting unit (17) sets a second frequency step size smaller than the first frequency step size. A center frequency changing unit (18) increases or decreases a center frequency of a variable bandstop filter (13) at the second frequency step size in order to output a control signal after the variable bandstop filter (13) removes a frequency component corresponding to the natural frequency after the change from the control signal.

2 Claims, 3 Drawing Sheets

MOTOR CONTROL DEVICE FOR SUPPRESSING NATURAL VIBRATIONS

RELATED APPLICATIONS

The present application claims priority to Japanese Application Number 2013-101613, filed May 13, 2013, the disclosure of which is hereby incorporated by reference herein in its entirety.

BACKGROUND

1. Field of the Invention

The present invention relates to a motor control device configured to output a control signal for controlling a motor, while suppressing natural vibrations of a target object constituted of the motor and a driven member to be driven by the motor.

2. Description of the Related Art

Conventionally, a motor control device provided with a bandstop filter configured such that a center frequency corresponding to a natural frequency of a target object is set in order to suppress natural vibrations of the target object constituted of a motor and a driven member to be driven by the motor in a machine tool, an industrial machine or a robot using the motor has been proposed.

Use of a bandstop filter in a motor control device makes it possible to remove a frequency component corresponding to a natural frequency of a target object from a control signal (e.g. a torque command) for controlling a motor. This makes it possible to control the motor, while suppressing natural vibrations of the target object.

When the spring constant of a ball screw is changed in accordance with the relative position between a motor and a driven member in driving the driven member by the motor via the ball screw along a linear moving axis of a machine tool, the natural frequency of the target object is changed in accordance with the position of the driven member being moved.

When the natural frequency of the target object is changed as described above, it may be impossible to suppress natural vibrations of the target object, because the frequency corresponding to the natural frequency of the target object is out of the bandwidth of the bandstop filter.

For instance, as described in Japanese Patent No. 4,238,273, a motor control device provided with a variable bandstop filter whose center frequency is variable in order to suppress natural vibrations of a target object even when the natural frequency of the target object is changed in accordance with the position of a driven member being moved has been proposed (see e.g. Patent Literature 1).

A conventional motor control device provided with a variable bandstop filter as described above is configured to extract a magnitude (power spectrum) of a frequency component included in a control signal at a predetermined frequency step size, and to detect a frequency corresponding to the natural frequency of a target object from the extracted magnitude of the frequency component.

The conventional motor control device is configured such that when the center frequency of the variable bandstop filter is changed by a change value equal to an integral multiple of 1 or more of the frequency step size resulting from a change in the natural frequency of the target object, the center frequency of the variable bandstop filter is made to coincide with the frequency corresponding to the natural frequency after the change by adding or subtracting a change value to or from the center frequency of the variable bandstop filter all at once.

Adding or subtracting a change value in accordance with a change in the natural frequency of a target object as described above makes it possible to appropriately change the center frequency of the variable bandstop filter in accordance with the position of the driven member being moved.

The predetermined frequency step size for use in extracting a frequency component included in a control signal in the conventional motor control device is set to a relatively large value (e.g. 10 Hz) when speedy detection of natural vibrations is prioritized to accurate detection of natural vibrations, and is set to a relatively small value (e.g. 1 Hz) when accurate detection of natural vibrations is prioritized to speedy detection of natural vibrations in a condition of a same frequency component extraction range and a same frequency component extraction period (a sampling period when a sampling value is subjected to discrete Fourier transform).

A smallest change amount of the natural frequency detectable by a motor control device increases, as the frequency step size increases. Therefore, the change amount per unit time between a control signal output from the variable bandstop filter before the center frequency of the variable bandstop filter is changed, and a control signal output from the variable bandstop filter after the center frequency of the variable bandstop filter is changed increases, as the frequency step size increases.

Therefore, when the center frequency of the variable bandstop filter is changed in accordance with the position of the driven member being moved, a change between a control signal output from the variable bandstop filter before the center frequency of the variable bandstop filter is changed, and a control signal output from the variable bandstop filter after the center frequency of the variable bandstop filter is changed may cause fluctuations in a control signal output from the variable bandstop filter.

The fluctuations in a control signal output from the variable bandstop filter increase, as the change amount per unit time between a control signal output from the variable bandstop filter before the center frequency of the variable bandstop filter is changed, and a control signal output from the variable bandstop filter after the center frequency of the variable bandstop filter is changed increases.

A mechanical shock increases, as the fluctuations in a control signal output from the variable bandstop filter increase, which may adversely affect the processing precision in performing processing by a machine tool.

In view of the above, there is a demand for a configuration of reducing fluctuations in a control signal output from a variable bandstop filter, which may occur when the center frequency of the variable bandstop filter is changed, when speedy detection of natural vibrations is prioritized to accurate detection of natural vibrations, specifically, when it is necessary to set a predetermined frequency step size for use in extracting a frequency component included in a control signal to be a relatively large value.

SUMMARY OF THE INVENTION

An object of the invention is to provide a motor control device that enables reduction of fluctuations in a control signal output from a variable bandstop filter, which is likely to occur when the center frequency of the variable bandstop filter is changed in performing speedy detection of natural vibrations of a target object constituted of a motor and a driven member to be driven by the motor.

A motor control device according to the invention is a motor control device configured to output a control signal for controlling a motor, while suppressing natural vibrations of a target object constituted of the motor and a driven member to be driven by the motor. The motor control device is provided with a frequency component extracting unit configured to extract a frequency component included in the control signal at a first frequency step size; a frequency detection unit configured to detect a frequency corresponding to a natural frequency of the target object constituted of the motor and the driven member to be driven by the motor from the frequency component extracted by the frequency component extracting unit; a frequency step size setting unit configured to set a second frequency step size smaller than the first frequency step size; a center frequency changing unit configured to change a center frequency in such a manner that the second frequency step size is successively added or subtracted to or from the center frequency, when the natural frequency is changed by an integral multiple of 1 or more of the first frequency step size in detecting a frequency corresponding to the natural frequency by the frequency detection unit; and a variable bandstop filter configured to input the control signal, and configured such that the center frequency is variable by the center frequency changing unit in order to output the control signal after a frequency component corresponding to the natural frequency after the change is removed from the control signal.

Preferably, the motor control device according to the invention may be further provided with an extraction range setting unit configured to set a frequency component range of the control signal to be extracted by the frequency component extracting unit.

Preferably, the motor control device according to the invention may be further provided with a setting range changing unit configured to change the frequency component range of the control signal to be set by the extraction range setting unit.

BRIEF DESCRIPTION OF THE DRAWINGS

The invention will be more clarified by referring to the accompanying drawings in which.

DETAILED DESCRIPTION

Figure 1:
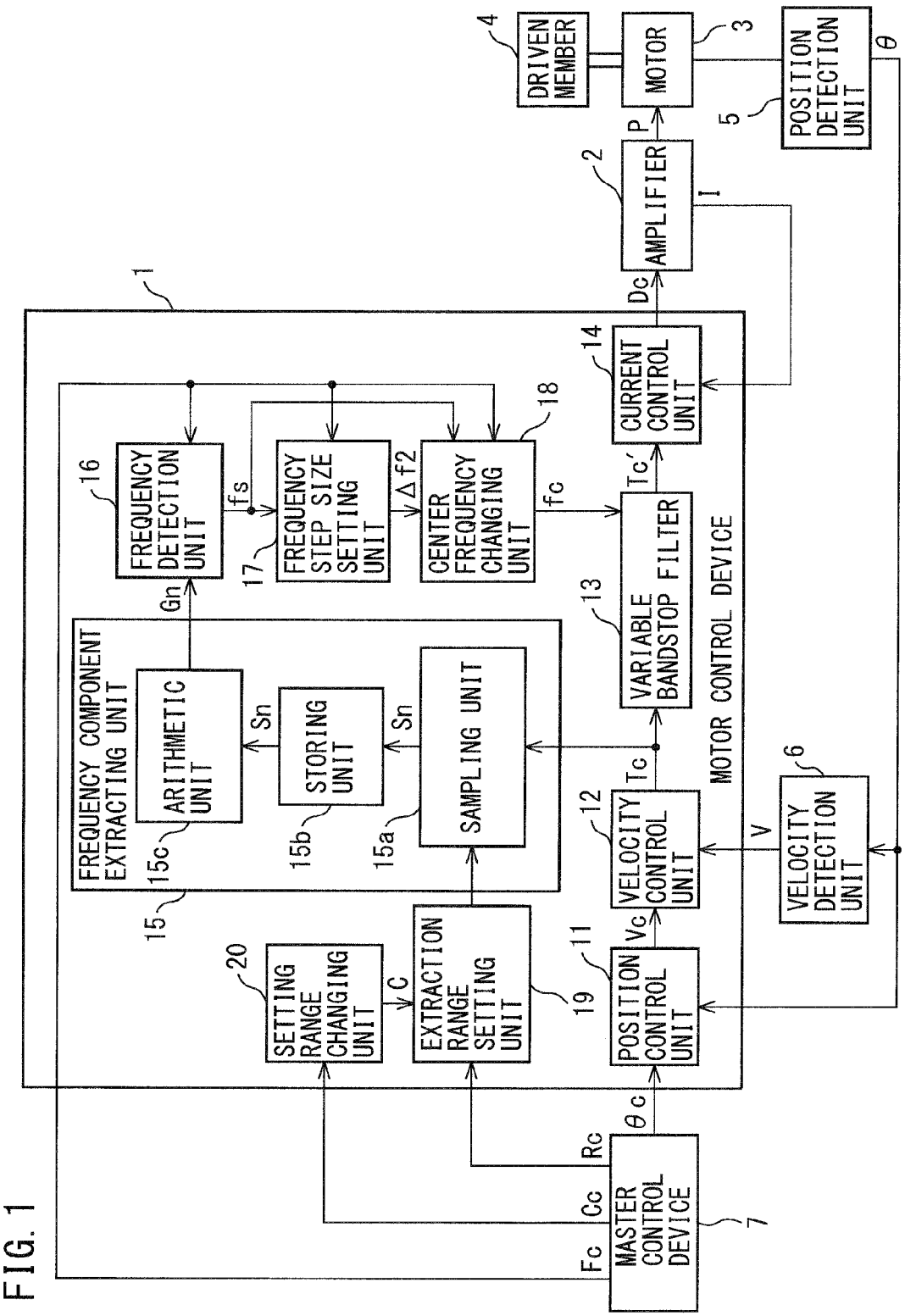
FIG. 1 is a diagram illustrating a system including a motor control device.

In the following, a motor control device for suppressing natural vibrations is described referring to the drawings. It should be noted, however, that the invention is not limited to the drawings or the embodiment described in the following.

FIG. 1 is a diagram illustrating a system including a motor control device. The system illustrated in FIG. 1 is provided with a motor control device 1, an amplifier 2, a motor 3, a driven member 4, a position detection unit 5, a velocity detection unit 6, and a master control device 7. The system illustrated in FIG. 1 is used for driving the driven member 4 via a ball screw (not illustrated) by the motor 3 along a linear moving axis (not illustrated) of a machine tool.

The motor control device 1 is configured to perform feedback control so that an error $\Delta\theta$ between an actual position $\theta$ of the motor 3 and a position command value $\theta c$ to the motor 3, an error $\Delta V$ between an actual velocity V of the motor 3 and a velocity command value Vc to the motor 3, and an error $\Delta I$ between an actual current value I of the motor 3 and a current command value Ic to the motor 3 are always zero.

The amplifier 2 is configured to receive a voltage command value Dc from the motor control device 1, and to supply electric power P to the motor 3 in response to the voltage command value Dc. Further, the amplifier 2 is configured to detect the actual current value I of the motor 3 and to feed back the current value I to the motor control device 1.

The motor 3 is constituted of a servo motor for driving the driven member 4 by the electric power P supplied from the amplifier 2. The motor 3 and the driven member 4 are a physical dynamical system having elasticity, a friction, and a mass, and resonate at a natural frequency to generate natural vibrations having a large amplitude when the rigidity and the attenuation characteristics are low.

The position detection unit 5 is constituted of a rotary encoder configured to detect the actual position $\theta$ of the motor 3, and is configured to output the actual position $\theta$ of the motor 3 to the motor control device 1 and to the velocity detection unit 6. The velocity detection unit 6 is configured to receive the actual position $\theta$ of the motor 3 from the position detection unit 5, to detect the actual velocity V of the motor 3 by first-order differentiating the actual position $\theta$ of the motor 3 by time, and to output the actual velocity V of the motor 3 to the motor control device 1.

The master control device 7 is constituted of a CNC (Computer Numeric Control), and is configured to input, to the motor control device 1, a center frequency initial value setting command fc, an extraction range setting command Rc, and a setting range changing command Cc to be described later, in addition to the position command value $\theta c$ to the motor 3.

The motor control device 1 is configured to output a torque command value Tc as a control signal for controlling the motor 3, while suppressing natural vibrations of a target object constituted of the motor 3 and the driven member 4 to be driven by the motor 3.

For the above control, the motor control device 1 is provided with a position control unit 11, a velocity control unit 12, a variable bandstop filter 13, a current control unit 14, a frequency component extracting unit 15, a frequency detection unit 16, a frequency step size setting unit 17, a center frequency changing unit 18, an extraction range setting unit 19, and a setting range changing unit 20.

Further, the position command value $\theta c$, the center frequency initial value setting command Fc, the extraction range setting command Rc, and the setting range changing command Cc to the motor 3, which are input from the master control device 7 to the motor control device 1, are digital signals. The motor control device 1 is constituted of a digital circuit.

Specifically, hardware of the motor control device 1 is constituted by use of an arithmetic unit such as a CPU, a storing device such as a semiconductor memory, a magnetic recording device or an optical recording device, an input device, an output device, and an input/output interface.

The position control unit 11 is configured to control the position of the motor 3, with use of the actual position $\theta$ of the motor 3 and the position command value $\theta c$ to the motor 3. For the above control, the position control unit 11 is configured to calculate an error $\Delta\theta$ between the actual position $\theta$ of the motor 3 and the position command value $\theta c$ to the motor 3, and to acquire a position control gain Gx from a memory (not illustrated). The position control unit 11 is configured to generate a velocity command value Vc corresponding to a product $Gx \times \Delta\theta$ of the position control gain Gx and the position error $\Delta\theta$, and to output the generated velocity command value Vc to the velocity control unit 12.

The velocity control unit 12 is configured to control the velocity of the motor 3, with use of the actual velocity V of the motor 3 and the velocity command value Vc to the motor 3. For the above control, the velocity control unit 12 is configured to calculate an error ΔV between the actual velocity V of the motor 3 and the velocity command value Vc to the motor 3, and a value (first-order integration velocity error SΔV) obtained by first-order integrating the velocity error ΔV; and to acquire a proportional gain Gy and an integral gain Gz from a memory (not illustrated).

The velocity control unit 12 is configured to generate a torque command value Tc as a control signal corresponding to the sum: Gy×ΔV+Gz×SΔV of the product Gy×ΔV of the proportional gain Gy and the velocity error ΔV, and the product Gz×SΔV of the integral gain Gz and the first-order integration velocity error SΔV; and to output the generated torque command value Tc to the variable bandstop filter 13.

The variable bandstop filter 13 is configured to receive the torque command value Tc, to remove, from the torque command value Tc, a frequency component corresponding to the natural frequency of a target object constituted of the motor 3 and the driven member 4 to be driven by the motor 3, and thereafter, to output to the current control unit 14, a torque command value Tc' as a control signal, in which the frequency component corresponding to the natural frequency of the target object is removed.

For the above control, the variable bandstop filter 13 is configured to attenuate, from the torque command value Tc, a frequency component in a predetermined bandwidth including a center frequency fc as a center of the bandwidth. Further, the variable bandstop filter 13 is configured such that the center frequency fc is variable, and as will be described later, the center frequency fc is set to a frequency fs corresponding to the natural frequency of the target object by the center frequency changing unit 18.

The variable bandstop filter 13 is configured such that the center frequency fc is variable by the center frequency changing unit 18 in order to output the torque command value Tc' after removing, from the torque command value Tc, a frequency component corresponding to the natural frequency of the target object after increase or decrease by a change value ΔC to be described later.

The current control unit 14 is configured to control the current of the motor 3, with use of the actual current value I of the motor 3 and the current command value Ic to the motor 3. For the above control, the current control unit 14 is configured to receive the actual current value I of the motor 3 from the amplifier 2, and to convert the torque command value Tc' into a current command value Ic to the motor 3.

The current control unit 14 is configured to generate a voltage command value Dc based on an error ΔI between the actual current value I of the motor 3 and the current command value Ic to the motor 3, and to output the generated voltage command value Dc to the amplifier 2.

As will be described later, the frequency component extracting unit 15 is configured to extract a frequency component of the torque command value Tc included in the frequency range set by the extraction range setting unit 19 at a frequency step size Δf1 (e.g. 10 Hz) as a first frequency step size. For the above control, the frequency component extracting unit 15 includes a sampling unit 15a, a storing unit 15b, and an arithmetic unit 15c.

The sampling unit 15a is configured to sample the torque command value Tc in the frequency range set by the extraction range setting unit 19 for N (e.g. N=400) times at the frequency step size Δf1 (i.e., at a sampling interval), whereby N sampling values Sn (n=0, . . . , N−1) are generated.

The storing unit 15b is configured to successively store the N sampling values Sn generated by the sampling unit 15a. The arithmetic unit 15c is configured to compute a frequency component Gn of the torque command value Tc at the frequency step size Δf1 by performing a discrete Fourier transform of the sampling value Sn stored in the storing unit 15b, and to output the computed frequency component Gn to the frequency detection unit 16.

Assuming that T is a sampling period of a torque command value, N is the sampling number, g is a torque command value obtained by sampling, |G| is a frequency component (spectral component) of the torque command value, and n=0, 1, 2, . . . , N−1, the discrete Fourier transform formula can be defined by the following:

$$G\left(\frac{n}{NT}\right) = \sum_{k=0}^{N-1} g(kT) \cdot \exp(-j2\pi nk/N)$$

where j is an imaginary unit, and k is a variable (k=0, 1, 2, . . . , N−1). Further, n/NT corresponds to a frequency of a frequency component to be extracted by the frequency component extracting unit 15.

In a condition of a same frequency component extraction range and a same sampling period, it is possible to speedily detect natural vibrations of a target object, as the frequency step size Δf1 increases. The frequency step size Δf1 is expressed by 1/NT. Therefore, for instance, in a condition that the sampling period T is 0.25 msec, and the sampling number N is 400, a time required for acquiring a frequency component of the torque command value Tc when the frequency step size Δf1 is 1 Hz is one second, and a time required for acquiring a frequency component of the torque command value Tc when the frequency step size Δf1 is 10 Hz is 0.1 second.

The frequency detection unit 16 is configured to detect a frequency fs corresponding to the natural frequency of the target object from the frequency component Gn computed by the arithmetic unit 15c. The frequency detection unit 16 is configured to determine that the number of vibrations corresponding to a frequency component having the magnitude of the frequency component Gn of not smaller than a predetermined threshold value, as a natural frequency; and to detect a frequency fs corresponding to the natural frequency.

The frequency detection unit 16 is configured to determine whether the frequency fs corresponding to the natural frequency coincides with the center frequency fc currently set in the variable bandstop filter 13, specifically, whether the frequency fs corresponding to the natural frequency is varied.

For the above control, the frequency detection unit 16 is configured to determine whether the frequency fs corresponding to the currently detected natural frequency coincides with the frequency fs corresponding to the previously detected natural frequency. When the frequency fs corresponding to the natural frequency is varied, the frequency detection unit 16 is configured to output a frequency fs corresponding to the currently detected natural frequency to the frequency step size setting unit 17 and to the center frequency changing unit 18 in order to change the center frequency fc into a new center frequency fc (i.e., a frequency fs corresponding to the currently detected natural frequency).

Further, the frequency detection unit 16 is configured to receive, from the master control unit 7, a center frequency initial value setting command Fc having information relating to an initial value fi (e.g., 250 Hz) of the center frequency fc, which is set immediately after driving of the motor 3; and to determine whether the initial value fi coincides with the frequency fs corresponding to the natural frequency detected for the first time.

In the case where the initial value fi does not coincide with the frequency fs corresponding to the natural frequency detected for the first time, the frequency detection unit 16 is configured to output a frequency fs corresponding to the natural frequency detected for the first time to the frequency step size setting unit 17 and to the center frequency changing unit 18 in order to change the center frequency fc into a new center frequency fc (i.e., a frequency fs corresponding to the natural frequency detected for the first time).

The frequency step size setting unit 17 is configured to set a frequency step size $\Delta f2$ as a second frequency step size smaller than the frequency step size $\Delta f1$ when the frequency fs is input from the frequency detection unit 16. The frequency step size setting unit 17 is configured to set the frequency step size $\Delta f2$ as the second frequency step size, which is a value obtained by dividing the frequency step size $\Delta f1$ by a positive integer of 2 or more (e.g., 10).

Further, the frequency step size setting unit 17 is configured to determine the frequency step size $\Delta f2$, based on a table (not illustrated), in which a difference between the previously input frequency fs or the initial value fi and the currently input frequency fs, the frequency step size $\Delta f1$, and the frequency step size $\Delta f2$ are correlated to each other.

The center frequency changing unit 18 is configured to change the center frequency fc into a new center frequency fc (i.e. a frequency fs corresponding to the currently detected natural frequency) by successively adding or subtracting the frequency step size $\Delta f2$ to or from the center frequency fc, when the frequency fs is input from the frequency detection unit 16, specifically, when the natural frequency is changed by an integral multiple of 1 or more of the frequency step size $\Delta f1$ in detecting the frequency fs corresponding to the natural frequency by the frequency detection unit 16.

The center frequency changing unit 18 is configured to change the center frequency fc by successively adding the frequency step size $\Delta f2$ to the center frequency fc until the increase amount of the center frequency fc reaches a change value $\Delta C$ when the frequency fs corresponding to the natural frequency increases by the change value $\Delta C$ (e.g., $\Delta C = \Delta f1$), which is a value obtained by multiplying the frequency step size $\Delta f1$ by a positive integer of 1 or more (e.g., 1) in accordance with the position of the driven member 4 being moved.

Further, the center frequency changing unit 18 is configured to change the center frequency fc by successively subtracting the frequency step size $\Delta f2$ from the center frequency fc until the increase amount of the center frequency fc reaches the change value AC when the frequency fs corresponding to the natural frequency decreases by the change value $\Delta C$ in accordance with the position of the driven member 4 being moved.

Further, the center frequency changing unit 18 is configured to set the center frequency fc to be set immediately after driving of the motor 3 to the initial value fi in response to the center frequency initial value setting command Fc to be input from the master control device 7.

The extraction range setting unit 19 is configured to receive, from the master control device 7, the extraction range setting command Rc having information relating to a frequency component range (e.g. the range: $fi \pm 5\Delta f1$) of the torque command value Tc to be extracted by the frequency component extracting unit 15 immediately after start of driving of the motor 3. Then, in response to the extraction range setting command Rc, the extraction range setting unit 19 is configured to set the frequency component range of the torque command value Tc to be extracted by the frequency component extracting unit 15, specifically, the frequency component range of the torque command value Tc to be sampled by the sampling unit 15a.

The setting range changing unit 20 is configured to change the frequency component range of the torque command value Tc to be set by the extraction range setting unit 19. For the above control, the master control device 7 is configured to input, to the setting range changing unit 20, the setting range changing command Cc having information relating to a frequency component range (e.g., $fc \pm 2\Delta f1$) of the torque command value Tc to be extracted by the frequency component extracting unit 15 after the change, after a lapse of a predetermined time (e.g., a predicted time required from start of driving of the motor 3 until the center frequency fc is set for the first time) from output of the extraction range setting command Rc to the extraction range setting unit 19.

Then, the setting range changing unit 20 is configured to change the frequency component range of the torque command value Tc to be set by the extraction range setting unit 19 in response to the setting range changing command Cc. For the above control, the setting range changing unit 20 is configured to output a change signal C to the extraction range setting unit 19 in response to the setting range changing command Cc, and to change the frequency component range of the command value Tc set by the extraction range setting unit 19.

Figure 2:
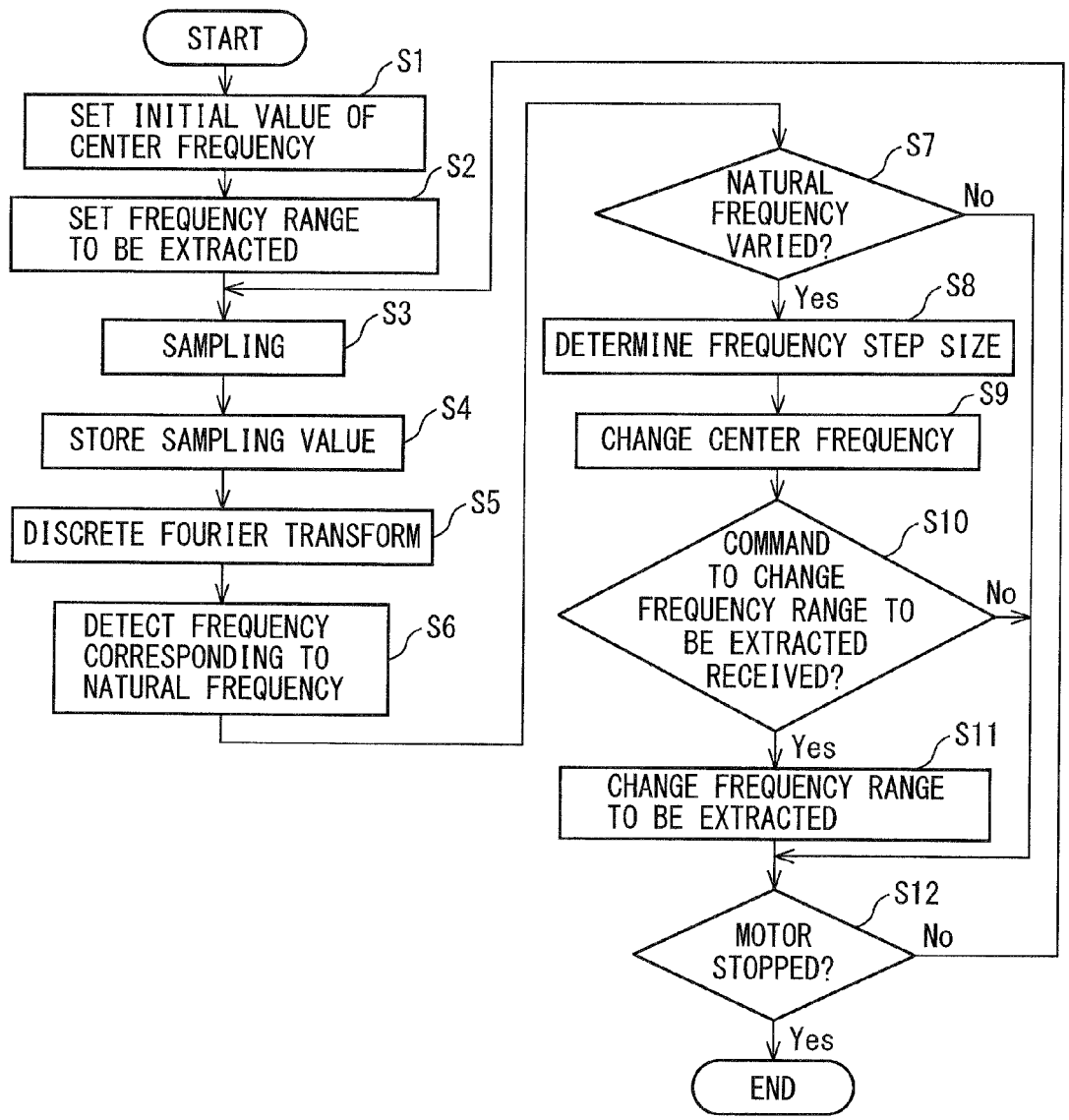
FIG. 2 is a flowchart of an operation to be performed by the motor control device in FIG. 1.

FIG. 2 is a flowchart of an operation to be performed by the motor control device in FIG. 1. The flowchart is executed immediately after start of driving of the motor 3, and is controlled by a processing program to be executed by the motor control device 1.

First of all, the center frequency changing unit 18 sets the center frequency fc to the initial value fi (in Step S1). Subsequently, the extraction range setting unit 19 sets the frequency component range of the torque command value Tc extracted by the frequency component extracting unit 15 (in Step S2).

Subsequently, the sampling unit 15a generates a sampling value Sn by sampling the torque command value Tc in the frequency range set by the extraction range setting unit 19 at the frequency step size $\Delta f1$ (in Step S3).

Subsequently, the storing unit 15b successively stores the sampling values Sn generated by the sampling unit 15a (in Step S4). Subsequently, the arithmetic unit 15c computes a frequency component Gn of the torque command value Tc at the frequency step size $\Delta f1$ by performing a discrete Fourier transform of the sampling values Sn stored in the storing unit 15b, and outputs the computed frequency component Gn to the frequency detection unit 16 (in Step S5).

Subsequently, the frequency detection unit 16 detects a frequency fs corresponding to the natural frequency of a target object from the frequency component Gn computed by the arithmetic unit 15c (in Step S6). Subsequently, the frequency detection unit 16 determines whether the frequency fs corresponding to the natural frequency is varied (in Step S7).

When the frequency fs corresponding to the natural frequency is varied, the frequency detection unit 16 outputs the frequency fs corresponding to the natural frequency to the frequency step size setting unit 17 and to the center frequency changing unit 18, and the frequency step size setting unit 17 determines the frequency step size $\Delta f2$ (in Step S8).

Subsequently, the center frequency changing unit 18 sets a new center frequency fc by changing the currently set center frequency fc into a frequency fs corresponding to the currently detected natural frequency (in Step S9).

Subsequently, the setting range changing unit 20 determines whether the setting range changing command Cc is input from the master control device 7 (in Step S10). When the extraction range setting command Rc is input from the master control device 7, the setting range changing unit 20 outputs a change signal C to the extraction range setting unit 19 in response to the setting range changing command Cc, and changes the frequency component range of the command value Tc set in the extraction range setting unit 19 (in Step S11).

Subsequently, the velocity control unit 12 determines whether the motor 3 is stopped, specifically, whether the actual velocity V of the motor 3 is zero (in Step S12). When the motor 3 is stopped, the processing flow is finished. On the other hand, when the motor 3 is not stopped, the processing flow returns to Step S3.

On the other hand, when it is determined that the frequency fs corresponding to the natural frequency is not varied in Step S7, and when it is determined that the extraction range setting command Rc is not input from the master control device 7 in Step S10, the processing flow proceeds to Step S12.

Figure 3:
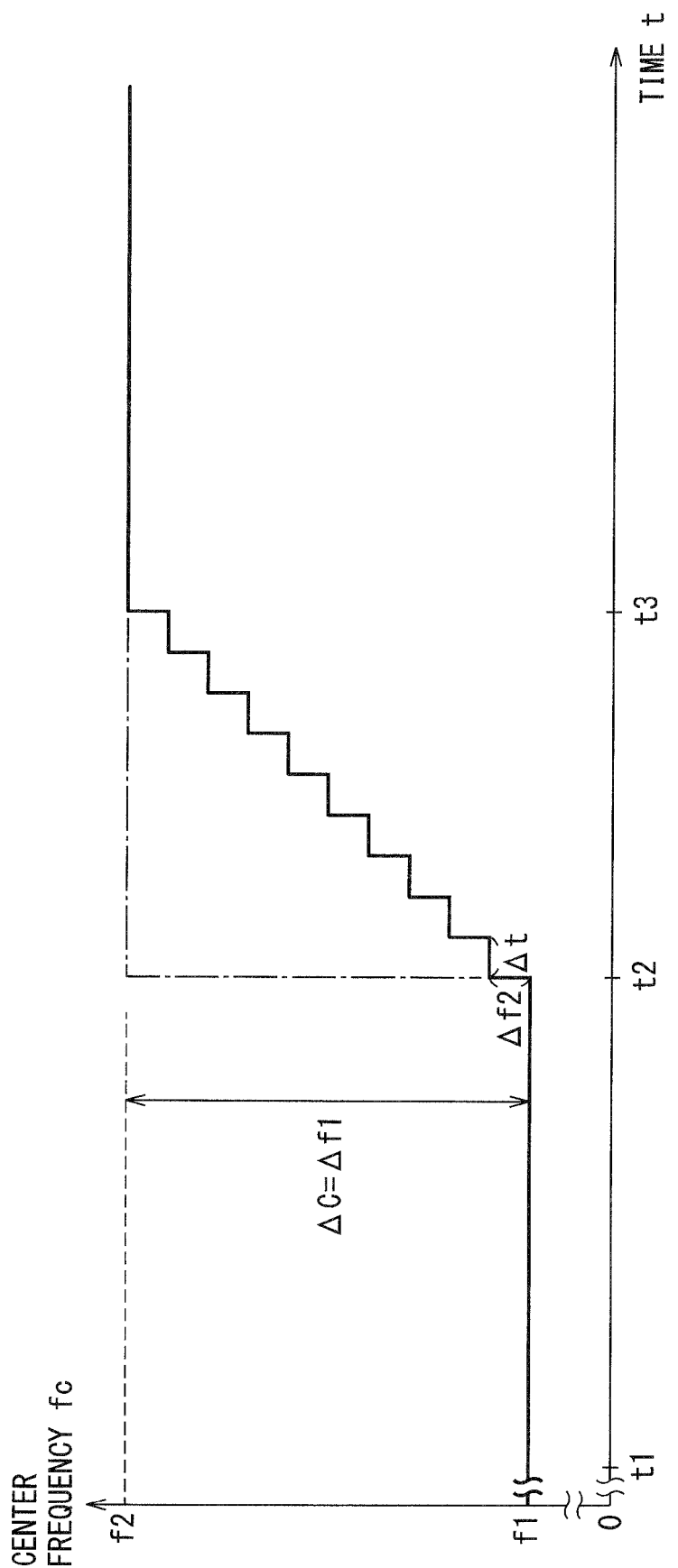
FIG. 3 is a diagram for describing a change in a center frequency of a variable bandstop filter by the motor control device in FIG. 1.

FIG. 3 is a diagram for describing a change in the center frequency of the variable bandstop filter by the motor control device in FIG. 1. Referring to FIG. 3, there is described a case, in which the frequency step size $\Delta f2$ is a value obtained by dividing the frequency step size $\Delta f1$ by 10, the change value $\Delta C$ of the center frequency fc is $\Delta f1$, and the center frequency fc is changed from f1 to f2 by successively adding the frequency step size $\Delta f2$ to the center frequency fc until the increase amount of the center frequency fc reaches the change value $\Delta C$ when the frequency fs corresponding to the natural frequency is increased by the change value $\Delta C$ in accordance with the position of the driven member 4 being moved.

After sampling during a time period from the point of time t1 to the point of time t2, storing of sampling values, a discrete Fourier transform, detection of a frequency fs corresponding to a natural frequency, detection of variation of the frequency fs corresponding to the natural frequency, and determination of the frequency step size $\Delta f2$ are performed, the center frequency changing unit 18 changes the center frequency fc from f1 to f2 by successively adding the frequency step size $\Delta f2$ to the center frequency fc at a time interval $\Delta t$ until the increase amount of the center frequency fc reaches the change value $\Delta C$, as illustrated by the solid line. Specifically, assuming that the time required for the increase amount of the center frequency fc to reach the change value $\Delta C$ is t3, t3−t2=9$\Delta t$. Further, the change of the center frequency fc is finished before a next sampling is finished.

In this way, successively adding the frequency step size $\Delta f2$ to the center frequency fc at the time interval $\Delta t$ until the increase amount of the center frequency fc reaches the change value $\Delta C$ for changing the center frequency fc from f1 to f2 makes it possible to reduce a change amount per unit time between a torque command value Tc' output from the variable bandstop filter 13 before the center frequency fc is changed, and a torque command value Tc' output from the variable bandstop filter 13 after the center frequency fc is changed, as compared with a configuration, in which the change value $\Delta C$ (i.e., $\Delta f1$) is added to the center frequency fc all at once, as illustrated by the one-dotted chain line in FIG. 3.

Therefore, in changing the center frequency fc from f1 to f2 by successively adding the frequency step size $\Delta f2$ to the center frequency fc at the time interval $\Delta t$ until the increase amount of the center frequency fc reaches the change value $\Delta C$, fluctuations in the torque command value Tc' output from the variable bandstop filter 13 is reduced, as compared with a configuration, in which the change value $\Delta C$ is added to the center frequency fc all at once.

Likewise, in changing the center frequency fc from f2 to f1 by successively subtracting the frequency step size $\Delta f2$ from the center frequency fc at the time interval $\Delta t$ until the decrease amount of the center frequency fc reaches the change value $\Delta C$, fluctuations in the torque command value Tc' output from the variable bandstop filter 13 is reduced, as compared with a configuration, in which the change value $\Delta C$ is subtracted from the center frequency fc all at once.

Successively adding the frequency step size $\Delta f2$ to the center frequency fc until the increase amount of the center frequency fc reaches the change value $\Delta C$, or successively subtracting the frequency step size $\Delta f2$ from the center frequency fc until the decrease amount of the center frequency fc reaches the change value $\Delta C$ makes it possible to reduce fluctuations in the torque command value Tc' output from the variable bandstop filter 13, even when it is necessary to set the frequency step size $\Delta f1$ to a relatively large value (e.g., 10 Hz) in order to prioritize speedy detection of natural vibrations to accurate detection of natural vibrations.

Further, setting the frequency component range of the torque command value Tc to be extracted by the frequency component extracting unit 15 makes it possible to perform high-speed detection of natural vibrations by reducing the load of arithmetic processing, and to reduce a required storage amount.

For instance, when the frequency component range of the torque command value Tc to be extracted by the frequency component extracting unit 15 is set to 200 Hz±50 Hz, assuming that the sampling period T is 0.25 msec, the frequency step size $\Delta f1$ is 10 Hz, and the sampling number N is 400, the frequency of a frequency component to be obtained is expressed by n/TN. Accordingly, a discrete Fourier transform is performed in the range: 15≤n≤25, and it is not necessary to perform a discrete Fourier transform with respect to the entirety of the range where n=1, 2, ... N−1 (in this case, 1≤n≤399).

Further, changing the frequency component range of the torque command value Tc to be extracted by the frequency component extracting unit 15 makes it possible to appropriately change the frequency component range of the torque command value Tc to be extracted by the frequency component extracting unit 15.

For instance, it is possible to change the frequency component range of the torque command value Tc to be extracted to the range: fs±2$\Delta f1$, after the frequency component range of the torque command value Tc to be extracted is set to the range: fi±5$\Delta f1$ for the first time. In this way, reducing the frequency component range of the torque command value Tc to be extracted from the range: fi±5$\Delta f1$ to the range: fs±2$\Delta f1$ makes it possible to further reduce the load of arithmetic processing after the center frequency fc is set for the first time. This is advantageous in increasing the detected velocity of natural vibrations.

The invention is not limited to the embodiment, but a variety of modifications and alterations are applicable. For instance, in the embodiment, the motor 3 drives the driven member 4 via a ball screw (not illustrated) along a linear moving axis (not illustrated) of a machine tool. The invention may also be applied to a configuration, in which the natural frequency of a target object is changed in accordance with the position of the driven member 4 being moved when the motor 3 drives the driven member 4 via a ball screw (not illustrated) along an axis (a gravity axis) which is affected by the gravity of a robot or the like.

In the embodiment, a control signal is a torque command value Tc. The invention is also applicable to a configuration, in which a control signal is a velocity command value Vc or a voltage command value Dc. When the control signal is the velocity command value Vc, the variable bandstop filter 13 is disposed between the position control unit 11 and the velocity control unit 12, and the position control unit 11 is configured to output the velocity command value Vc to the sampling unit 15a. On the other hand, when the control signal is the voltage command value Dc, the variable bandstop filter 13 is disposed between the current control unit 14 and the amplifier 2, and the current control unit 14 is configured to output the voltage command value Dc to the sampling unit 15a.

In the embodiment, the frequency detection unit 16 is configured to determine whether the frequency fs corresponding to a natural frequency is varied. Alternatively, the frequency step size setting unit 17 and the center frequency changing unit 18 may be respectively configured to determine whether the frequency fs corresponding to a natural frequency is varied.

In the embodiment, the setting range changing unit 20 is disposed on the outside of the extraction range setting unit 19. Alternatively, the setting range changing unit 20 may be disposed on the inside of the extraction range setting unit 19.

In the embodiment, the frequency step size $\Delta f2$ is a value obtained by dividing the frequency step size $\Delta f1$ by a positive integer of 2 or more. Alternatively, the frequency step size $\Delta f2$ may be set to a value other than the value obtained by dividing the frequency step size $\Delta f1$ by a positive integer of 2 or more. For instance, when the frequency step size $\Delta f1$ is set to 10 Hz, the frequency step size $\Delta f2$ is set to 9 Hz and 1 Hz, and the frequency fs corresponding to the natural frequency is increased by 10 Hz in accordance with the position of the driven member 4 being moved, it is possible to change the center frequency fc by successively adding 9 Hz and 1 Hz to the center frequency fc.

In the embodiment, the center frequency fc is changed in such a manner that the center frequency fc coincides with the frequency fs corresponding to the natural frequency after change. Alternatively, it is possible to change the center frequency in such a manner that the frequency fs corresponding to the natural frequency after change lies in the bandwidth of the variable bandstop filter 13.

In the embodiment, the frequency step size $\Delta f1$ is fixed (e.g., 10 Hz). Alternatively, the frequency step size $\Delta f1$ may be variable. For instance, it is possible to change the frequency step size $\Delta f1$ to be a relatively small value (e.g., 1 Hz) in order to prioritize accurate detection of natural vibrations to speedy detection of natural vibrations, after the frequency step size $\Delta f1$ is set to a relatively large value (e.g. 10 Hz) in order to prioritize speedy detection of natural vibrations to accurate detection of natural vibrations.

According to the invention, it is possible to reduce fluctuations in a control signal output from a variable bandstop filter, which are likely to occur when the center frequency of the variable bandstop filter is changed in performing speedy detection of natural vibrations of a target object constituted of a motor and a driven member to be driven by the motor.

What is claimed is:

1. A motor control device configured to output a control signal for controlling a motor, while suppressing natural vibrations of a target object constituted of the motor and a driven member to be driven by the motor, the motor control device comprising:
   a frequency component extracting unit configured to extract a frequency component included in the control signal at a first frequency step size;
   a frequency detection unit configured to detect a frequency corresponding to a natural frequency of the target object constituted of the motor and the driven member to be driven by the motor from the frequency component extracted by the frequency component extracting unit;
   a frequency step size setting unit configured to set a second frequency step size smaller than the first frequency step size;
   a center frequency changing unit configured to change a center frequency in such a manner that the second frequency step size is successively added or subtracted to or from the center frequency, when the natural frequency is changed by an integral multiple of 1 or more of the first frequency step size in detecting a frequency corresponding to the natural frequency by the frequency detection unit;
   a variable bandstop filter configured to input the control signal, and configured such that the center frequency is variable by the center frequency changing unit in order to output the control signal after a frequency component corresponding to the natural frequency after the change is removed from the control signal; and
   an extraction range setting unit configured to set a frequency component range of the control signal to be extracted by the frequency component extracting unit.

2. The motor control device according to claim 1, further comprising:
   a setting range changing unit configured to change the frequency component range of the control signal to be set by the extraction range setting unit.

* * * * *